United States Patent

Hirafuji

[15] 3,646,832
[45] Mar. 7, 1972

[54] CORDED-SPRING ENERGY CONTROL DEVICE

[72] Inventor: Ban Hirafuji, Yokohama, Japan
[73] Assignee: Ricoh Co., Ltd., Tokyo, Japan
[22] Filed: Apr. 23, 1970
[21] Appl. No.: 31,328

[30] Foreign Application Priority Data

May 31, 1969 Japan..............................44/42788

[52] U.S. Cl..................................74/519, 74/104, 74/470, 74/491
[51] Int. Cl. .........................................................G05g 1/04
[58] Field of Search ..........................74/470, 491, 104, 519

[56] References Cited

UNITED STATES PATENTS 1,816,164  7/1931  Wood ..................................74/519 X

*Primary Examiner*—Milton Kaufman
*Attorney*—Henry T. Burke, Robert Scobey, Robert S. Dunham, P. E. Henninger, Lester W. Clark, Gerald W. Griffin, Thomas F. Moran, R. Bradlee Boal and Christopher C. Dunham

[57] ABSTRACT

A device for automatically controlling the elastic energy of a coiled spring when an operation lever pivotally supported by a shaft and normally urged in one direction by one end of the coiled spring is caused to move in the other direction against the biasing force of the spring. The device comprises means to relieve the other end of the coiled spring when the operation lever is moved in the other direction as aforementioned so as to thereby restrict an increase in the elastic energy of the coiled spring.

4 Claims, 4 Drawing Figures

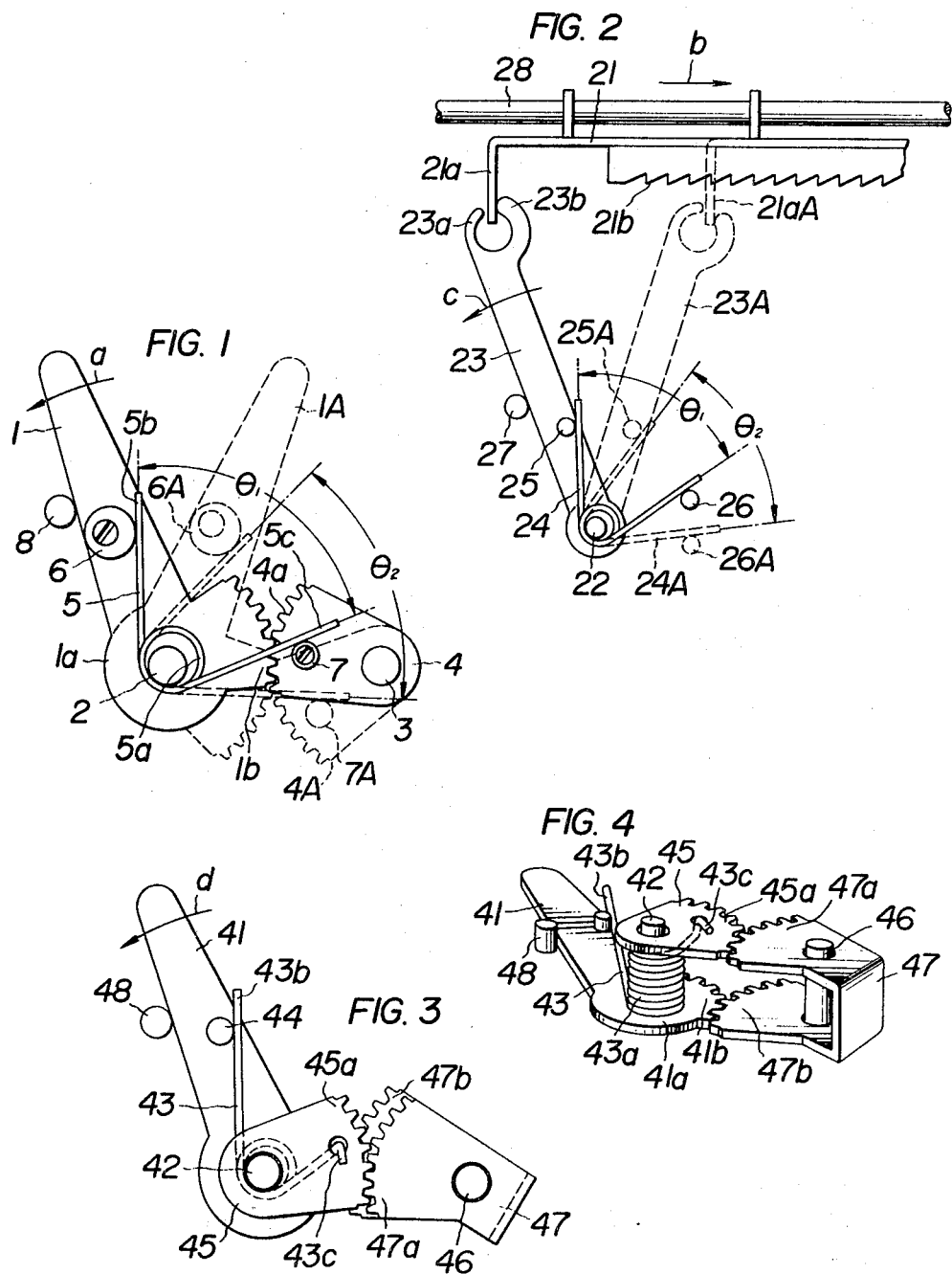

CORDED-SPRING ENERGY CONTROL DEVICE

BACKGROUND OF THE INVENTION

In one linkage known in the art, an operation lever connected at its free end to one end of a sliding member adapted to move linearly in reciprocating motion is pivotally supported at its base by a shaft and normally urged in one direction by a coiled spring. In causing the sliding member to move linearly in reciprocating motion, an external force is exerted on the sliding member and hence the operation lever to cause them to move in a direction opposite to the direction in which the operation lever is normally urged. The operation lever moves in pivotal motion about the shaft against the biasing force of the spring. When the sliding member reaches a predetermined point, the external force is removed to permit the sliding member and the operation lever to return to their starting positions by virtue of the biasing force of the spring. Then, an external force is exerted again and this cycle of operation is repeated so that the sliding member may move in linear sliding motion. Such linkage is in practical use, for example, with the pin box of a portable calculating machine.

When the forces moving the sliding member in linear reciprocating motion, particularly the force which causes the operation lever to move in pivotal motion against the biasing force of the spring, are applied to the sliding member and operation lever of the conventional linkage described, the resilience of the coiled spring shows a variation in magnitude depending on the degree of displacement of the operation lever. Therefore, when the free end of the operation lever is moved against the biasing force of the coiled spring, the force exerted on the operation lever must be greater in the terminating stage of the pivotal movement of the lever than in the initial stage thereof in order that the reciprocating movement of the sliding member may take place smoothly.

The mechanism of the type mentioned above in which a sliding member is moved by an external force in a direction opposite to the direction in which a member connected to the sliding member is normally urged by a coiled spring, tension spring or compression spring can have application in not only the pin box of a portable calculating machine but also in other equipment. In such applications, it is desirable that the force which moves the sliding member in linear reciprocating motion be maintained constant.

If the coiled spring had a length which is sufficiently great to render the displacement of the operation lever insignificant, the elastic energy of the spring could be maintained constant regardless of the extent of displacement of the operation lever. However, this arrangement is not possible because an increase in the length of the spring makes it impossible to obtain a compact overall size in a portable calculating machine.

SUMMARY OF THE INVENTION

This invention relates to devices for controlling the elastic energy of a coiled spring. More particularly, the invention is concerned with a device for automatically controlling the elastic energy of a coiled spring when an operation lever normally urged in one direction by the coiled spring is caused to move in the opposite direction against the biasing force of the spring.

An object of the invention is to provide a device for automatically controlling the elastic energy of a coiled spring which permits the resilience of the coiled spring to remain substantially constant when an operation lever under the influence of the coiled spring is caused to move in pivotal motion.

Another object of the invention is to provide connecting means effective to connect the operation lever under the influence of the coiled spring with a pivotal member.

Additional objects as well as features and advantages of this invention will become evident from the description set forth hereinafter when considered in conjunction with the accompanying drawings.

BRIEF DESCRIPTION OF THE DRAWINGS

In the drawings,

FIG. 1 is a plan view of one embodiment of the device for automatically controlling the elastic energy of a coiled spring according to this invention;

FIG. 2 is a partial plan view of the device according to this invention as it is used as means for moving the pin box of a portable calculating machine;

FIG. 3 is a plan view of another embodiment of the device according to this invention; and FIG. 4 is a perspective view of the device shown in FIG. 3.

DESCRIPTION OF THE PREFERRED EMBODIMENTS

In FIG. 1, an operation lever 1 pivotally supported by a shaft 2 connected to a fixed member (not shown) is formed integral with a segmental gear 1b at its base portion 1a. The segmental gear 1b is in meshing engagement with a segmental gear 4a formed at one end of a pivotal member 4 which is pivotally supported at the other end by a fixed shaft 3.

The operation lever 1 is normally urged in the direction of arrow a in FIG. 1 by a coiled torsion spring 5 which comprises a main body 5a loosely mounted on the shaft 2, one end portion 5b maintained in engagement with an eccentric cam 6 adjustably mounted on the operation lever 1, and the other end portion 5c maintained in engagement with a roller 7 mounted on a pin fixed to the pivotal member 4. The movement of the operation lever 1 by the biasing force of the coiled spring 5 is restricted by a fixed pin 8 which engages one side of the operation lever 1.

If the operation lever 1 is moved by an external force in pivotal motion in a direction opposite to the direction of arrow a in FIG. 1 against the biasing force of the coiled spring 5, the lever 1 will move from a solid line position to a broken line position 1A. The pivotal member 4 having the segmental gear 4a in meshing engagement with the segmental gear 1b of the lever 1 will also move in pivotal motion from a solid line position to a broken line position 4A. Likewise, the eccentric cam 6 and roller 7 will move from solid line positions to broken line positions 6A and 7A respectively, so that opposite ends of the coiled spring 5 will move from solid line positions to broken line positions.

The torsional moment $T$ of the spring 5 can be given by the formula $$T = K/\theta$$

where $K$ is the spring constant and $\theta$ is the angle formed by the two end portions 5b and 5c of the spring 5. In the embodiment described above, the difference between the angle $\theta_1$ of the spring 5 before the displacement of the operation lever takes place and the angle $\theta_2$ of the spring 5 after the displacement of the operation lever has taken place is small in spite of the substantial angle of pivotal movement of the operation lever, so that no great variation is caused in the elastic energy of the coiled spring 5. If the value of $\theta$ is maintained constant at all times, the resilience of the coiled spring 5 will remain constant at all times during the pivotal movement of the operation lever 1. By gradually increasing or reducing the value of $\theta$, the resilience of the coiled spring 5 can be varied as desired.

The embodiment described above is an example in which the angle is gradually reduced. That is, the angle $\theta_2$ after the displacement of the operation lever is smaller than the angle $\theta_1$ before the displacement. However, the difference between the two angles $\theta_2$ and $\theta_1$ is much smaller in this embodiment than in prior art arrangements in spite of the substantial angle of pivotal movement of the operation lever 1. Although the elastic energy of the spring 5 gradually increases as the displacement of the operation lever 1 increases, no significant increase is caused in the resilience of the spring 5 as aforementioned.

The eccentric cam 6 permits the resilience of the coiled spring 5 to be varied as desired after the parts are assembled. Any other suitable stopper means may be substituted for it.

FIG. 2 shows an example of a linear movement device wherein the linkage of the embodiment just described is utilized for maintaining constant the resilient restoring force imparted to a sliding member 21 as much as possible. In FIG. 2, the sliding member 21 slidably supported by a fixed shaft 28 is adapted to move in the direction of arrow $b$ in intermittent movement by virtue of a rack 21$b$. Such sliding member 21 is used as a carrier of the pin box of a portable calculating machine wherein it is required to impart a substantially constant resilient restoring force to the sliding member during its movement. The sliding member 21 has a bent portion 21$a$ at its left end as seen in the figure which is loosely held by a pair of fingers 23$a$ and 23$b$ formed at the free end of an operation lever 23 pivotally supported by a shaft 22 secured to a fixed member (not shown) of the calculating machine. A coiled spring 24 mounted on the shaft 22 engages a pin 25 on the operation lever 23 and a pin 26 (corresponding to the roller 7 in FIG. 1) on a pivotal member (not shown) which moves as the pin 25 moves.

The operation lever 23 is normally urged in the direction of arrow $c$ by the spring 24, its movement in the indicated direction being restricted by a fixed pin 27. If the sliding member 21 is moved in the direction of arrow $b$ and the bent portion 21$a$ moves to a broken line position 21$a$A, the operation lever 23 will move against the biasing force of the spring 24 to a broken line position 23A, with the pins 25 and 26 moving to broken line positions 25A and 26A respectively. As a result, the spring 24 moves to a broken line position 24A. In this state, a resilient restoring force acting in a direction opposite to the direction of arrow $b$ is imparted by the spring 24 to the sliding member 21 through the operation lever 23.

The resilience of the spring 24 to which the sliding member 21 is subjected is maximized when the bent portion 21$a$ of the sliding member 21 and operation lever are aligned vertically, since the sliding member 21 moves in linear motion and the operation lever moves in rotational motion. The resilience is gradually reduced after the sliding member 21 has passed a position in which the bent portion 21$a$ is aligned vertically with the operation lever 23. On the other hand, the amount of displacement of the pin 26 relative to the amount of displacement of the pin 25 is set such that the resilience of the spring 24 acting on the operation lever 23 is gradually increased as the displacement of the spring increases. Thus, the resilience of the spring 24 acting on the sliding member can be maintained substantially constant regardless of the position in which the sliding member 21 is disposed.

FIGS. 3 and 4 show another embodiment of the device for automatically controlling the elastic energy of a coiled spring according to this invention. An operation lever 41 pivotally supported by a fixed shaft 42 is formed integral with a segmental gear 41$b$ in its base portion 41$a$. Mounted on the shaft 42 is a main body 43$a$ of a coiled spring 43 which has one end 43$b$ engaging a pin 44 secured to the operation lever and the other end 43$c$ engaging a pivotal member 45 pivotally supported by the shaft 42. The pivotal member 45 is formed integral with a segmental gear 45$a$. The segmental gears 45$a$ and 41$b$ are in meshing engagement with segmental gears 47$a$ and 47$b$ respectively formed in a gear member 47 pivotally supported by a shaft 46.

The operation lever 41 is normally urged in the direction of arrow $d$ in FIG. 3 by the spring 43, and its movement in the indicated order is restricted by a fixed pin 48. The ratio of the radius of rotation of the segmental gear 41$b$ to the radius of rotation of the segmental gear 47$b$ has a value which differs from the value of the ratio of the radius of rotation of the segmental gear 47$a$ to the radius of rotation of the segmental gear 45$a$. Thus, it is possible to linearly increase or reduce the resilience of the spring 43 acting on the operation lever as the latter moves in pivotal motion. If the values of the two ratios mentioned above are so set that there is no substantial difference between them, the resilience of the spring 43 will undergo substantially no change even if the operation lever 41 moves in pivotal motion.

In the two embodiments described above, gear means is used as means for moving the pivotal member in response to the movement of the operation lever. It is to be understood that any other suitable means such as forked levers engaging each other may be used.

What I claim is:

1. A device for controlling the elastic energy of a coiled spring, comprising an operation lever pivotally supported on a shaft, a member pivotally supported for motion about an axis extending in the same direction as said shaft, a coiled spring having one end engaging said operation lever and the other end engaging said member, connecting means for connecting said operation lever with said member and moving the latter in conjunction with the former as the former is moved in pivotal motion so as to thereby restrict an increase in the elastic energy of said spring, and stop means for restricting the pivotal movement of said operation lever caused by said spring.

2. A device for controlling the elastic energy of a coiled spring as in claim 1, wherein said connecting means comprises a first segmental gear fixed to said operation lever for concurrent movement therewith, and a second segmental gear fixed to said member for concurrent movement therewith, said two segmental gears being maintained in meshing engagement with each other, and said operation lever and said member being supported on parallel shafts.

3. A device for controlling the elastic energy of a coiled spring as in claim 1, wherein said connecting means comprises two segmental gears respectively fixed to said operation lever and said member for concurrent movement therewith, said lever and said member being pivotally supported by the same shaft, and two segmental gears fixed to each other for concurrent movement and supported by a second shaft parallel to said shaft supporting said operation lever and said member, said last-mentioned two segmental gears having different radii of rotation, the segmental gear of larger radius of rotation being in meshing engagement with the segmental gear formed integral with said operation lever and the segmental gear of smaller radius of rotation being in meshing engagement with the segmental gear formed integral with said member.

4. A device for controlling the elastic energy of a coiled spring as in claim 1, wherein said operation lever is connected at its free end to a sliding member for supporting a pin box of a portable calculating machine.

* * * * *